United States Patent [19]

May

[11] Patent Number: 4,640,842

[45] Date of Patent: Feb. 3, 1987

[54] INTERNALLY FLAVORED HULLED CEREAL GRAIN AND PROCESS FOR PREPARATION

[76] Inventor: William A. May, 5 House Wren, Hackettstown, N.J. 07840

[21] Appl. No.: 764,711

[22] Filed: Aug. 13, 1985

Related U.S. Application Data

[63] Continuation-in-part of Ser. No. 697,204, Feb. 1, 1985, which is a continuation-in-part of Ser. No. 547,131, Oct. 31, 1983, abandoned, and a continuation-in-part of Ser. No. 577,342, Feb. 6, 1984, abandoned, and a continuation-in-part of Ser. No. 605,466, Apr. 30, 1984, abandoned.

[51] Int. Cl.$^4$ ............................ A23L 1/00; A23L 1/18
[52] U.S. Cl. .................................... 426/534; 426/618; 426/640; 426/462; 426/507; 426/625; 426/597; 426/660; 426/650; 426/589
[58] Field of Search ................. 426/93, 103, 244, 250, 426/251, 271, 302, 308–310, 331, 532–538, 618–629, 632, 634, 640, 654, 460, 462, 482, 507

[56] References Cited

U.S. PATENT DOCUMENTS

| | | | |
|---|---|---|---|
| 2,518,247 | 8/1950 | Nairn | 426/251 |
| 3,753,730 | 8/1973 | Donnarumma | 426/618 |
| 3,961,091 | 6/1976 | Caccavale et al. | 426/307 |
| 4,097,613 | 6/1978 | Young et al. | 426/89 |

FOREIGN PATENT DOCUMENTS

| | | |
|---|---|---|
| 202259 | 11/1955 | Australia . |
| 240978 | 9/1959 | Australia . |
| 267774 | 1/1964 | Australia . |
| 47345/68 | 12/1968 | Australia . |
| 2641767 | 3/1969 | Australia . |
| 476834 | 1/1975 | Australia . |
| 47151/79 | 5/1979 | Australia . |
| 0648619 | 9/1962 | Canada ............. 426/459 |

OTHER PUBLICATIONS

Rice Chemistry and Technology, Chptr. 8, by K. R. Bhattacharya, pp. 289–295, 301, 302, 305, 311 & 315–316.

Primary Examiner—Raymond N. Jones
Assistant Examiner—Marianne M. Cintins
Attorney, Agent, or Firm—John W. Klooster

[57] ABSTRACT

Internally flavored hulled cereal grain, especially popcorn is provided along with a method for the preparation of same.

33 Claims, No Drawings

INTERNALLY FLAVORED HULLED CEREAL GRAIN AND PROCESS FOR PREPARATION

RELATED APPLICATIONS

This application is a continuation-in-part of my copending U.S. patent application Ser. No. 697,204 filed Feb. 1, 1985 which in turn was a continuation-in-part of each of my copending U.S. patent applications Ser. No. 547,131 filed Oct. 31, 1983, (now abandoned), U.S. Ser. No. 577,342 filed Feb. 6, 1984 (now abandoned), and U.S. Ser. No. 605,466 filed Apr. 30, 1984 (now abandoned). The disclosure and contents of each of these applications is incorporated hereinto by reference.

BACKGROUND OF THE INVENTION

1. Field of the Invention

This invention lies in the field of methods for internally flavoring hulled cereal grain, especially popcorn, and to the flavored grain products so produced.

2. Prior Art

Since earliest times, hulled cereal grains have been cultured and used for food by man and domesticated animals. Various processes have been developed for treating whole grain. Thus, for example, Legendre U.S. Pat. No. 1,702,735 describes grain preservation by adding thereto a powder containing lime, calcium carbonate, and sodium carbonate.

Madrazo et al teaches contacting whole grain with an alkaline aqueous solution at elevated temperature.

Gulstad U.S. Pat. No. 3,580,727 describes steeping grain (including corn) in a lime-water solution and thereafter explosively puffing the resulting kernels and milling the puffed grain into flour or meal.

Rogers et al U.S. Pat. No. 2,358,250 reports treating grain prior to milling to impart to flour subsequently milled therefrom a vitamin and soluble salt content, the Rogers et al process involving steeping the grain in water "at a suitable temperature" to infuse thereinto a vitamin and salt extract.

Anthony U.S. Pat. No. 4,064,275 hydrates dry grains using continuously re-circulating water. The water may contain additives such as vitamins, nutrients (no flavorants or colorants), and minerals.

McAlister U.S. Pat. No. 3,682,651 reports dispersing water into cereal grain and applying microwave energy thereto while simultaneously reducing atmospheric pressure. In one embodiment, sugar, glucose, oil and gelatin cover "each grain" before microwave treatment.

The acceptance of popcorn as a stable food product is well established and with its acceptance has also come the addition thereto of flavors, such as salt, butter, cheese and caramel, to enhance and improve consumer acceptance. Methods for flavor addition to popped popcorn are well known and some attempts have been made to externally fix or coat flavorant compositions to popcorn prior to the popping thereof in an effort to improve flavor distribution and execution in the popped corn.

For example, Nairn U.S. Pat. No. 2,518,247 describes coating popcorn kernels to inhibit change in moisture content thereof during storage using a coating composition of vegetable and animal fats and oils, salt, and a flavorant.

Kracauer U.S. Pat. No. 3,704,133 mixes popcorn kernels with shortening, a lipophilic surfactant, and water prior to popping.

Donnarumma et al U.S. Pat. No. 3,753,730 describes flavoring particular grain products by applying thereto a composition of flavoring agent, film-former, and vehicle.

Grunewald-Kirstein U.S. Pat. No. 3,843,814 describes coating popcorn at elevated temperature with a liquid comprised of oil or fat containing dissolved sugar.

Caccavale et al U.S. Pat. No. 3,961,091 describes popcorn treated with cooking oil and encapsulated flavoring substances, as does Young et al U.S. Pat. No. 4,096,281. See also Mason et al U.S. Pat. No. 4,163,066. Gorham, Jr. et al U.S. Pat. No. 3,882,255, Tomlinson U.S. Pat. No. 3,950,567 and Martin U.S. Pat. No. 2,604,407.

Also, various packaged products and preparation methods therefor are described wherein unpopped popcorn is coated with a popping composition involving the use of oil or fat which can sometimes contain flavorants and colorants.

Evidently, the popcorn industry has heretofore avoided the presence of excess moisture or water in the vicinity of popcorn for the evident reason that water tended to impair the popability of popcorn. Contemporary literature does disclose, however, that the moisture content of popable popcorn can be varied somewhat without significantly impairing popability, but if a maximum or a minimum moisture level is exceeded for a given popcorn, then popping is impaired. Popcorn popping reportedly occurs because the pericarp of heated popcorn acts as a pressure vessel which ruptures under internal steam pressure to produce expansion of the endosperm; see, for instance, the article by Hoseney et al in J. of Cer. Sci. (1983) 43–52 entitled: "Mechanism of Popcorn Popping."

So far as now known, all prior art attempts to improve flavor execution in popped popcorn by treating unpopped popcorn kernels have involved only externally (relative to the unpopped popcorn) applied coatings or the like.

A process for producing dyed popcorn kernels utilizing an aqueous solution treatment followed by drying is reported in Schwarzkopf U.S. Pat. No. 3,537,861. However, dyes are submitted to be different from, not equivalent to, and not suggestive of organic flavorants. The Schwarzkopf conditions of dying characteristically apparently result in a minimum of deep dye penetration into the endosperm structure of individual popcorn kernels. Also, the amount of dye taught by Schwarzkopf for his coloration of individual popcorn kernels appears to be generally less than the amount of flavorant typically needed in internal flavoring of popcorn as in my present invention to produce a natural type or level of odor and taste in the popped kernels.

So far as is presently known, however, no prior art teachings exist wherein hulled cereal grain, particularly popcorn, has been internally flavored with organic flavorant.

Furthermore, no art is now known wherein an internal flavoring of hulled cereal grain has been accomplished in such a way that the product material, as in the case of popcorn especially, is not only shelf life stable, but also can be popped or otherwise further and finally processed into an edible food without an appreciable loss of kernel popability, or endosperm expansion capability, or other property associated with normal untreated starting hulled cereal grain.

Moreover, no prior art is known where an internally flavored hulled cereal grain product can have during such further processing (e.g., popping or the like) a distinct aroma of a predetermined or desired character, and the resulting product can have a distinct taste comparable to that of a natural product whose flavor the flavorant resembles.

The art needs new and improved methods of flavoring hulled cereal grain both for improving and strengthening the usability of conventional techniques for hulled cereal grain processing and utilization, and also for making possible entirely new and very useful food products based thereon.

BRIEF SUMMARY OF THE INVENTION

In one aspect, the present invention relates to new and very useful processes for introducing an organic flavorant into hulled cereal grain. The process involves the steps of contacting such grain with such flavorant in a dissolved or colloidal condition under aqueous liquid phase conditions while maintaining a temperature in the range from about 60° to 200° F. for a time at least sufficient to internally flavor such hulled cereal grain with at least an organoleptically detectable taste of such flavorant.

The time/temperature relationship during such contacting is such that in such contacting substantially no change in grain hull (pericarp) structure occurs.

Preferably, the contacting is carried out with additional agents being present, such as edible ionic salt, edible surfactant, edible colorant, and/or the like. Preferably gelatinization of grain endosperm starch is minimized.

The organic flavorants employed herein contain at least four carbons per molecule and when such a flavorant contains at least one carboxyl group per molecule, then such flavorant has a dissociation constant in water which is less than about $1 \times 10^{-5}$.

The resulting so contacted internally flavored hulled cereal grain is preferably washed to remove excess flavorant, and/or is preferably dried to produce a product which preferably has a moisture content resembling that of untreated air-dried naturally produced hulled cereal grain.

In another aspect, the present invention relates to a new article of manufacture comprising internally flavored hulled cereal grain wherein the flavorants are as above described. Such flavored grains are producable by the practice of a process taught by the present invention.

While a present particularly preferred product of the present invention comprises internally flavored popable popcorn, those skilled in the art will appreciate that other hulled cereal grains can be internally flavored in accordance with teachings of the present invention, such as field corn, wheat, oats, rye, rice, sorghum, triticale, millet, and the like.

In another aspect, the present invention relates to various new and improved products produced from such internally flavored hulled cereal grains, such as internally flavored popped, puffed or expanded corn, wheat, oats, sorghum and the like.

Another aspect of the present invention relates to an internally flavored microwave oven popable popcorn having an appropriate moisture content, and to a process for making the same.

Another aspect of the present invention relates to hulled cereal grains which are flavored internally and which are adapted for further processing with or without inclusion with other components into snack foods, cereal foods, paste, and the like, including also low calorie content foodstuffs.

Other and further objects, aims, purposes, features, advantages, examples, embodiments and the like will be apparent to those skilled in the art from the teachings of the present application.

DETAILED DESCRIPTION

As used herein, the term "flavorant" has reference to a substance which when added to food imparts thereto a specific organoleptic perception. A flavorant does not produce a physiological organoleptically sensed sweet taste; thus, a flavorant is not a sweetener. A flavorant produces a perceivable organoleptic response. Characteristically, a flavorant is volatile. Typically, a flavorant may be a mixture of one or more substances. The flavorants employed in the practice of the present invention are organic in composition.

As those skilled in the art appreciate, many different organic flavorants are known. One compilation of flavorants appears in the book: "Source Book Of Flavors" by Henry B. Heath published by the AVI Publishing Company, Inc., Westport, Conn., Copyright 1981. This book additionally provides organoleptically detectable threshold values for individual flavorants when such are used in food stuffs. The procedure used for determining organoleptic threshold values is also cited and described in the Heath work; see pages 18 to 22 thereof. Another compilation of organic flavorants for use in the United States and suggested acceptable use levels in foodstuffs appears in the book: Flavor Materials 1979 by R. A. Ford published by the Allied Publishing Corp., Wheaton, Ill., Copyright 1979.

Flavorants used in this invention are preferably previously approved for food use by either USFDA or Flavor and Extract Manufactures Association.

By a term such as "organoleptically detectable" "organoleptic perception," or equivalent, as used herein reference is had to the ability of the human sensory system, including taste buds olefactory organs, and the palate, to detect and characterize a particular flavor. By the utilization of an expert taste panel procedure, and/or by using a modified procedure based upon that above referenced as used by Heath, the presence and intensity of a given flavorant can be organoleptically readily detected, as those skilled in the art will appreciate.

The term "sweetener" as used herein has reference to a substance which is non-volatile and which induces the taste sensation of sweet (the other recognized primary taste sensations being sour, salty, and bitter). Since a sweetener is detectable primarily by taste only, it is not classified as a flavorant in the present invention.

By the term "edible" as used herein reference is had to the capability of a specific material of being eaten at least for a short term by USDA and USFDA standards without toxic or other undesirable physiological consequences to mammals (especially man).

By the term "cereal grain" as used herein reference is had to any member of the grass family (Graminae) which produces edible, starchy grains suitable for use as food by man and his livestock. The grains usable as starting materials in the practice of the present invention are hulled; that is, they contain initially an intact pericarp as well as a germ and an endosperm. Examples of various cereal grains are described herein.

The term "hull" or "pericarp" as used herein has reference to the outer, usually hard, covering of a cereal grain. Starting hulled grains need to have a pericarp whose structural integrity is such as to permit the same to act as an autoclave when such starting grain is naturally popable at an appropriate moisture content when it is desired to make an internally flavored grain product which is also popable at an appropriate moisture content.

The term "germ" as used herein has reference to a small mass of living substance, sometimes termed the embryo in combination with the scutellum of a cereal grain; typically, for example, the germ is separatable from the starchy endosperm during milling.

The term "endosperm" as used herein has reference to the nutritive material within the embryo sac or aleurone layer of cereal grain.

By the term "internally flavored," particularly as used herein in reference to hulled cereal grain produced by the teachings of the present invention, reference is had to the circumstance that a flavorant material has become so associated with an individual hulled cereal grain that such material cannot be removed by aqueous washing at ambient conditions. In addition, the quantity of such flavorant material so associated with such an individual hulled cereal grain is such that, when such grain's hull is separated (sometimes termed "decorticated") from such grain's germ and endosperm, particularly in the region of such grain's so called tip cap, the flavor associated with such flavorant material is organoleptically detectable in such germ and endosperm. In addition, such flavorant material is so associated with such an individual hulled cereal grain that, when such grain's hull or endosperm is separated from such grain's germ and endosperm, and the resulting germ and endosperm portions are exposed in air to a temperature of 212° F. for a time of two minutes and then cooled, the so heat-cycled germ and endosperm still contain an organoleptically detectable quantity of such flavorant material.

In place of an organoleptic detection procedure, one can sometimes employ a properly calibrated electronic odorimeter means in a flavorant detection procedure.

The circumstance that a given flavorant is not in the form of a coating or superficial layer on individual hulled cereal grain particles of a batch is demonstrated or demonstrable by any convenient means, as those skilled in the art will appreciate. For example, in a preferred method of introducing organic flavorant into a hulled cereal grain as described in the present invention, washing the treated (contacted) grain with water following the contacting step between flavorant and grain removes therefrom substantially only excess (surface deposits) of flavorant and not impregnated (infused) flavorant.

The circumstance that a particular hulled cereal grain, for example, corn, has been internally flavored in accordance with the teachings of the present invention, can also be demonstrated by any convenient analytical technique. For example, in the case of corn, internally flavored corn produced by the teachings of the present invention can be tested as follows to determine whether or not internal flavoring has been achieved: In a first step, the treated kernel is manually subjected to excision of the endosperm one millimeter approximately above the tip of each popcorn kernel. Thereafter, in a second step, each excised portion is subjected to a peeling operation to remove the pericarp wherein the residual endosperm materials are mixed together and ground up as with a mortar and pestle or the like. In a subsequent step, the resulting powder is subjected to thin layer chromatography (such as HPTLC or the like) so as to detect qualitatively and/or quantitatively the presence of foreign material relative to the usual or normal composition of the endosperm in the tip region. Other state of the art analytical detection techniques can be employed.

For example, when endosperm material that has been internally flavored with a particular flavorant system evaluated as above described, with the operator of, for example, a thin layer chromatographic detection equipment preferably being aware of the particular flavorants used, such flavorant system can evidently be readily detected. While any convenient flavorant system can be used when carrying out such a test procedure, it is presently preferred to employ a material such as diacetyl, gamma nonalactone, or the like because of the ease and sensitivity of detection achieved therewith.

Those skilled in the art will appreciate that any hulled cereal grain can be similarly evaluated (other than corn) to determine the accomplishment of internal flavoring as taught herein.

As indicated herein above, popcorn, which is identifiable by the scientific name Zea mays everta, and which is internally flavored as taught herein, constitutes a presently preferred product of the present invention. By the term "popable" as used herein, reference is had to popcorn which is not yet popped. Similarly, by the term "popped" as used herein, reference is had to popcorn which has been heat expanded. Many different procedures are known for popcorn popping as those skilled in the art readily appreciate. Such procedures along with a discussion of the mechanism of popcorn popping appears in the article by Hosney et al appearing of "Journal of Cereal Science" volume one, pages 43–52 (1983).

The hulled cereal grain employed as a starting material in the practice of the present invention preferably has a normal water (moisture) content, although as those skilled in the art will appreciate, abnormally moist or abnormally dry hulled cereal grain can be employed as a starting material in the practice of the present invention. In addition, the starting grain preferably has an intact hull structure. In the case of popcorn, unless the hull structure is intact initially, the product popcorn will not pop (after drying as taught herein).

Table I (below) indicates the typical (normal) moisture content of the various exemplary hulled cereal grains, and also provides a presently preferred operating range for the moisture contents of such hulled cereal grains for internally flavoring in accordance with the teachings of the present invention. As shown in the following Table I, such a preferred operating range is broader than a moisture content range within the normal range since practice of the present invention does not appear to be restricted to the use of hulled cereal grains having definite moisture contents. Larger and smaller moisture contents than those suggested in Table I, can of course, be employed, if desired, in achieving flavorant impregnation in accordance with the teachings of the present invention.

TABLE I

Moisture Contents of Untreated Hulled Cereal Grains

| Hulled cereal Grain Starting Material | Typical (Normal) Moisture Content Range | Suitable Operating Range for Moisture Contents for Use In This Invention |
|---|---|---|
| fieldcorn | 14.0–16.0 | 10.0–19.0 |
| popcorn | 13.5–14.5 | 10.0–19.0 |
| wheat | 9.5–11.0 | 9.0–19.0 |
| oats | 8.5–10.0 | 8.0–15.0 |
| rye | 9.5–11.0 | 9.0–17.0 |
| barley | 9.5–11.0 | 9.0–17.0 |
| triticale | 10.0–12.0 | 8.0–16.0 |
| sorghum | 9.5–11.0 | 9.0–17.0 |
| rice | 10.5–12.0 | 9.5–16.0 |
| millet | 10.0–12.0 | 8.5–14.5 |

So called "flavor oils" or "flavorant oils" (organic liquids) generally appear to be particularly suitable as a class of flavorants adapted for use in the practice of the present invention. Typically, the flavor oils known to the prior art have been previously developed for application to food products and typically consist of concentrated mixtures of volatile and/or non-volatile chemicals containing specific flavor attributes in small quantities, and suitable aqueous solvent for dilution and solubility properties. For example, a typical compounded butter formula of the type known to the prior art for general application to foods is illustrated in the following Table II:

TABLE II

Typical Prior Art Compounded Butter Flavor Organic Liquid Concentrate Formula

| Component | Parts |
|---|---|
| Methyl Pyridine Ketone | 0.10 |
| Butyric Acid | 0.10 |
| Ethyl Caprate | 0.20 |
| Diacetyl | 0.20 |
| Capric Acid | 0.40 |
| Undecenoic Acid | 0.60 |
| Sulferol | 0.60 |
| Ethyl Maltol | 0.80 |
| Delta Dodecalactone | 1.40 |
| Delta Decalactone | 2.00 |
| Caprylic Acid (1% soln.) | 6.80 |
| Propylene glycol As Solvent | 986.80 |

Preferably, organic flavorants employed for impregnating hulled cereal grains, such as popcorn kernels, according to the present invention are first compounded with other organic flavorant chemicals to produce flavorant compositions which impart a particular desired taste for use in an internally flavored hulled cereal grain product of the present invention. In general, an organic flavorant becomes effectively encapsulated in a hulled cereal grain and tends not to be appreciably leached out or extracted out of the treated (organic flavorant impregnated) grain upon subsequent washing and drying. Some examples of organic flavorants (chemicals and oils) presently believed to be useful in the practice of the present invention are shown in the following Table III as follows:

TABLE III

Examples of Flavorants

| | |
|---|---|
| Caproic Acid | Dill Seed Oleoresin & Oil |
| Caprylic Acid | Methyl Mercaptain |
| Diacetyl | Sulferol |
| Gamma Decalactone | Vanillin |
| Delta Decalactone | Ethyl Vanillin |
| Gamma Nonalactone | 5-Methyl Furfural |
| Gamma Octalactone | Bitter Almond Oil |
| Delta Dodecalactone | Benzylaldehyde |
| Ethyl Butyrate | Deltr Tetra Decalactone |
| Iso Amyl Acetate | Beta Carotene |
| Amyl Iso Acetate | Lipolyzed Butter Oils |
| Cocoa extract | Starter Distillate |
| Decanoic Acid | Methyl Nonyl Ketone |
| Undecenoic Acid | Isovaleraldehyde |
| Acetyl Methyl Carbinol | Heliotropin |
| Phenyl Acetaldehyde | Eugenol |
| 1-Octene-3-ol | Dimethyl Anthranilate |
| Isobutyraldehyde | Methyl Thiol |
| Lypolyzed Butter Oil | Oleoresin Paprika |
| Ethyl Propionate | 6-Methyl Coumarin |
| 2-Hexenal | Benzo Dihydro Pyrone |
| 3-Hexenol | Aldehyde C-14 |
| Beta Demascone | Furaneol |
| Cis-3-Hexenol | Garlic Oleoresin |
| Fennugreek Absolute | Garlic Extract |
| Dimethyl Sulfide | Green cognac oil |
| Ethyl maltol | Pyridine |
| Methional | Onion Oil & Oleoresin |
| 2-Acetyl Pyrazine | Onion extract |
| Tetramethyl Pyrazine | Black Pepper Oleoresin |
| D'Limonene | Sage Oil & Oleoresin |
| Methyl Sulfide | Nutmeg Oil & Oleoresin |
| Furfural | Nutmeg Oil |
| 2,5-Dimethyl Pyrazine | Cunin Oil |
| Wintergreen Oil | Lemon Oils |
| Trimethyl Pyrazine | Lime Oils |
| Star Anise Oil | Oil Lime Distilled |
| Thyme Oleoresin | Methoxy Pyrazine |
| Marjoram Oleoresin | Jasmine Extract |
| Oreganum Oil | Orange & Tangerine Oils |
| Oreganum Oleoresin | Menthol |
| Bay Oleoresin & Oil | Peppermint Oils |
| Coriander Oil & Oleoresin | Pimenta Oleoresin |
| Clove Oil & Oleoresin | Guaiacol |
| Cassia Oil | |
| Rosemary Oleoresin & Oil | |
| Oleoresin Capsicum | |
| Oleoresin Ginger | |
| Celery Oleoresin | |
| Lipolyzed butter oil (e.g. "Dariteen L-95") | |

Structurally related flavorant chemicals can also be utilized. The organic flavorant in any given case can be a chemical derivative (synthetic material), a botanical extract, or the like.

The greater the water solubility of an organic flavorant, the better. Thus, an organic flavorant of the prior art which is not soluble in water displays relatively low ability to transfer or pass through grain hulls, particularly under the typical and preferred mild contacting conditions which are taught herein, and so water insoluble flavorants are preferably avoided. However, no minimum level of water solubility for an organic flavorant used in the practice of this invention is known.

Organic solvent soluble and/or oil soluble organic flavorants apparently tend to leave a film on the outside surfaces of grain treated therewith which can render the postcontacting removal of excess or residual organic flavorants on the surface portions of such treated grain relatively difficult or slow to accomplish, and so such flavorants are also preferably avoided. Also, grain with a high residual organic flavorant content on the surface portions thereof can tend to be unstable in storage which can limit otherwise desirable shelf life characteristics.

As those skilled in the art appreciate, organic flavorant chemicals (including oils) which are relatively slightly soluble in water can be sometimes increased in water colloidal dispersability by preliminary encapsulation in microcapsules or the like. For example, flavorant chemicals and oils in the form of droplets can be preliminarily spray dried with a modified starch (such as that known as capsul) or gum acacia as a carrier.

If one insists (as, for example, for flavor reasons) on using a flavorant chemical or oil of limited water solubility in the practice of this invention, one can first prepare a flavorant concentrate which is capable of forming an oil-in-water emulsion, or a colloidal suspension. Thereby a maximum percentage of such flavorant is in true solution at any given time.

In practicing the present invention, it is convenient and also generally presently preferred, to prepare concentrated liquid flavorant compositions initially. A typical such preferred composition is a solution that contains a major amount of organic flavorant (that is, greater then about 50% by weight of total composition) and a minor amount of liquid carrier (that is, less than 50 weight percent, same basis).

For example, such a concentrated flavorant solution or dispersion (including suspension) can contain from about 20 to 80 weight percent of flavorant, and, correspondingly, from about 80 to 20 weight percent of water. Other organic liquid carriers, mixtures or solvents can be present. Such an organic liquid is preferably miscible with water. Minor amounts of edible emulsifier or surfactant can be dissolved in the concentrate in order to produce a stabilized such emulsion or colloidal dispersion, as those skilled in the art will appreciate. In addition, such a concentrate can optionally contain any one or more of the following: edible ionic salt, and/or edible colorant.

A class of concentrated flavorant compositions presently preferred for use in the present invention is illustrated in Table IV below:

TABLE IV

Liquid Concentrated Flavorant Compositions

| Component | Weight Percent Range (100 wt % composition basis) | |
|---|---|---|
| | broad | preferred |
| (1) total organic flavorant* (pref. dissolved completely) | 1 to 100 | 20 to 80 |
| (2) water | 0 to 50 | 0 to 20 |
| (3) organic liquid carrier (miscible with water preferably) | 0 to 90 | 10 to 50 |
| (4) edible ionic salt (dissolved completely) | 0 to 10 | 0 to 3 |
| (5) surfactant (dissolved completely) | 0 to 5 | 0 to 1 |
| (6) colorant (dissolved completely) | 0 to 5 | 0.5 to 3.0 |

*If the flavorant comprises 100% of the concentrate, then at least one of the component flavorants is a liquid (oil) wherein the others are dissolved or dispersed.

Such a concentrated flavorant composition can be used directly for contacting with grain when impregnating such in accordance with the teachings of the present invention, but such concentrate should contain at least about 35 weight percent of water at the time of contacting. However, typically and preferably, such a flavorant concentrate is diluted with a liquid carrier (water preferably, or water and inert organic liquid as shown in Table V) to provide an aqueous treating composition. In general, it is desired to use aqueous treating compositions in contacting whole grain with organic flavorants to accomplish flavorant impregnation according to the present invention because such treating compositions now appear to provide, in general, the capability of achieving a maximum transfer of flavorant from treating composition into hulled grain with a minimum of other effects upon the treated grain. A class of presently preferred such liquid treating compositions for use in the practice of the present invention is illustrated in Table V below. Compositions of Table V can be prepared from concentrate compositions of Table IV, or they can be prepared directly from various starting materials.

TABLE V

Aqueous Treating Compositions

| Component | Weight Percent Range (100 wt % composition basis) | |
|---|---|---|
| | broad | preferred |
| (1) total organic flavorant (pref. dissolved completely) | 0.5 to 45 | 5 to 35 |
| (2) water | 55 to 99.5 | 60 to 80 |
| (3) organic liquid carrier (miscible with water preferably) | 0 to 15 | 1 to 4 |
| (4) edible ionic salt (dissolved completely) | 0 to 20 | 6 to 18 |
| (5) surfactant (dissolved completely) | 0 to 10 | 1 to 5 |
| (6) colorant (dissolved completely) | 0 to 5 | 0.5 to 2.5 |

As indicated above in Tables IV and V (and in the accompanying text), the presence of an edible inorganic ionic salt appears to be desirable in a treating composition of the present invention but an ionic salt is not a necessary component of a treating composition. By the term "inorganic ionic salt" reference is had to an inorganic salt which dissociates in aqueous solution form into anions and cations. The extent of dissociation of an inorganic ionic salt can vary from one salt to another, but it is presently preferred to employ highly water soluble inorganic ionic salts with a high degree of dissociation, and more preferably, inorganic salts which are substantially completely dissociated in 0.1 Normal water solution.

Presently preferred highly soluble inorganic ionic salts which may be used in the practice of the present invention are those wherein the cationic portion thereof is selected from the group consisting of alkali metals, alkaline earth metals, and ammonium, while the anionic portion thereof is selected from the group consisting of halides, nitrates, sulfates, phosphates, and carbonates.

Examples of presently preferred inorganic ionic salts include sodium chloride (presently most preferred) calcium chloride, sodium phosphate, potassium chloride, magnesium chloride, mixtures thereof, and the like.

Although, when ionic salt is present in a treating composition, it is preferred to employ inorganic salts, it will be understood that in place of, or in combination with, such edible inorganic ionic salt(s), one can employ, if desired, an edible organic ionic salt, particularly one having water solubility and dissociation characteristics similar to those associated with the inorganic salt, as above described.

A presently preferred class of organic ionic salts comprises those wherein the cationic portion is as above characterized while the anionic portion is at least one an edible mono-, di-, and/or tri-carboxylate containing less than seven carbon atoms each.

Examples of presently preferred organic ionic salts include monosodium glutamate, trisodium citrate, sodium or calcium propionate, inositol monophosphate, guanidine monophosphate, sodium succinate, mixtures thereof, and the like.

Based upon presently available evidence, it appears that the presence of such ionic salt in an aqueous treating composition is desirable because it enhances or promotes transfer of organic flavorant from such treating composition into hulled grain. This effect is evidently independent of any physiological effect produced by a given salt, such as the taste of salty produced by sodium chloride.

It is theorized (and there is no intent to be bound by theory herein) that such ionic salts, when present in an aqueous treating composition, increase the osmotic pressure thereof, and that such an increase in osmotic pressure enhances the infusion of organic flavorant into hulled cereal grain. It is also theorized that such ionic salts, when so present, provide a "salting out" effect in the grain kernel interior which aids in depositing organic flavorant within the endosperm. It is further theorized that such ionic salts, when so present, aid in solubilizing at least some organic flavorants. The exact reason(s) why such ionic salts apparently produce such improved transfer is not now known with certainty.

Another reason why such edible ionic salts are desirable in a treating composition is that, when from about 12 to 20 weight percent of an aqueous treating composition is comprised of such dissolved salt material, such treating composition resists invasion of (growth and development of) microorganisms. Suppression of microorganisms is advantageous in commercial-scale hulled grain organic flavorant impregnation operations particularly where the treating medium is to be revised for a plurality of successive grain impregnation operations, such as hereinbelow described.

Those skilled in the art appreciate that edible inorganic ionic salts, as a class, are not flavorants since such salts characteristically do not produce an organoleptic response such as is produced by an organic flavorant. Rather such salts produce only a primary taste and no odor. The taste is classifiable as "salty", though many edible inorganic ionic salts do not even produce a detectable salty taste, as those skilled in the art appreciate.

Also, those skilled in the art appreciate that it is possible, in the class of edible organic ionic salts, that an organic salt can function as an organic flavorant.

Further, those skilled in the art appreciate that a number of edible ionic salts can be classified as so called "incidental additives" to a given flavorant composition. As an incidental additive, an edible ionic salt can function as a potentiator, an enhancer, or accentuator which heightens the organoleptic response associated with the flavor of such a given organic flavorant composition. For example, inositol monophosphate and guanidine monophosphate may be used in a meat flavoring or in a cheese flavoring to enhance the savory qualities thereof, yet such salts are not recognized as organic flavorants by the U.S. FDA. If a particular edible ionic salt can serve as a useful incidental additive to a given flavorant composition which is to be used for impregnating a particular hulled grain in a contacting operation, then such can be conveniently and even preferably included in the treating composition at some suitable level, as those skilled in the art will appreciate.

Edible surfactants, such as those approved by the USFDA, appear to be desirable for use in treating compositions of the present invention as shown in Tables IV and V because such surfactant appear to aid in impregnating hulled grain with organic flavorant from a treating composition as taught herein. It is theorized that such surfactants tend to soften the structure of the hulled cereal grain, thereby permitting impregnation to occur more easily. There is no intent anywhere herein to be bound by theory. Edible nonionic surfactants as a class presently appear to be preferred. Examples of presently preferred edible surfactants for use in the practice of the present invention include mono- and di-glycerides, propylene glycol esters, sorbitan esters, polyoxyethylene sorbitan esters (presently particularly preferred), glycerol esters, lactated esters, polyglycerol esters, lecithin, and related compounds, mixtures thereof, and the like.

Also, if desired, a treating composition of the invention can contain an edible colorant as shown in Tables IV and V. Typical edible colorants for use in the present invention are those which are approved by the USFDA and are selected from the group consisting of food dyes, botanical extracts, and color-producing flavorants. If used, it is preferred to employ edible colorants which resemble a natural product which has the taste of the particular organic flavorant being impregnated from a given treating composition, thereby to enhance palatability of the ultimate product produced from flavorant impregnated hulled cereal grain produced in accordance with the present invention. Preferably the colorant chosen is soluble in, or colloidally dispersed in the treating composition.

Examples of suitable colorants include, for example, glycosides, and carotenoids which provide red and yellow colors to enhance, for example, cheese, butter, and fruit flavors. Mixtures of colorants can be employed.

Examples of natural color sources or colorants suitable for use in the practice of the present invention are shown in Table VI below:

TABLE VI
Pelargonidin (carmine)
Cyanidin (Tagetes Extract)
Delphinidin (Canthaxanthin)
Malvinidin (Grape Skin Extract)
Beta Carotene
Alpha Carotene (B-Apo-8-Carotenal)
Lycopene (Annatto Extract)
Chlorophyll (Dried Algae Meal)

Preferably, the flavorant is substantially completely dispersed in a molecular or colloidal size in the aqueous carrier during the impregnation (contacting) process for treating hulled cereal grain in accordance with the present invention. Thus, by the term "molecular . . . size" reference is had to the fact that the flavorant is dissolved in the aqueous liquid carrier. Similarly by the term "colloidal size" reference is had to the fact that the flavorant is in the form of an emulsion or is colloidally dispersed or suspended in the aqueous carrier liquid.

By the term "inert" or "substantially inert" as used herein in relation to an organic liquid or solvent employed in an aqueous carrier, reference is had to the fact that such is substantially not reactive with hulled cereal grain, flavorant, or other materials employed in the practice of the present invention.

An inert organic solvent liquid when present preferably has a molecular weight under about 250 and a boiling point under about 300° F. Preferably, such has a molecular weight under about 100 and has a boiling point under about 100° F. Examples of suitable inert organic solvent liquids include, for example, alcohols, aldehydes, ketones, aliphatic hydrocarbons, esters, ethers, alkyl halides, chlorinated low molecular weight hydrocarbons, and the like. Preferably such an organic liquid is miscible with water.

Examples of organic solvents along with their boiling points in ° C. at 760 mm Hg are shown in Table VII below:

TABLE VII

Examples of Solvent Carriers

| | Boiling Point °C. at 76 mm Hg |
|---|---|
| Methyl chloride | −24 |
| Ethyl chloride | 12.5 |
| Isopentane | 27–31 |
| Petroleum ether (in specified boiling ranges) | 30–70 |
| Diethyl ether/pentane 2.1 | 33.5 (azeotrope) |
| Diethyl ether | 35 |
| Pentane | 36 |
| Dichloromethane | 40.5 |
| *Acetone | 58 |
| Chloroform | 61 |
| Tetrahydrofuran | 66 |
| *Hexane | 69 |
| Ethyl acetate | 77 |
| Carbon tetrachloride | 77.5 |
| *Ethanol | 78.5 |
| Benzene | 80 |
| Cyclohexane | 81 |
| Heptane | 98.5 |
| Methyl glycol (Cellosolve) | 124.5 |
| Ethyl glycol (Cellosolve) | 135 |
| n-Amyl acetate | 138 |
| Isoamyl acetate | 142.5 |
| Cyclohexanol | 160 |
| *Propylene glycol | 188 |
| Tetrahydronaphthalene | 207 |
| *Glycerol | 290 |

Table VII Footnote:
Liquids marked with an asterisk in TABLE VII are presently preferred chiefly because of their good volatility characteristics and because of their approval by FDA for use in foods.

Mixtures of water with inert organic carrier liquids can be desirable and even preferred. For example, mixtures of from about 0.1 to 45 weight percent of an inert organic liquid having a molecular weight under about 100 and having a boiling point under about 100° F. in combination with water up to a balance of 100 weight percent based on total liquid carrier weight comprise a class of preferred carrier compositions for use in the practice of the present invention. Alternatively, a carrier liquid composition can comprise on a 100 weight percent basis up to about 50 weight percent an organic inert liquid having a molecular weight under about 100 and a boiling point under about 100° F. in combination with (preferably miscible with) at least about 50 weight percent water.

Preferably the organic liquid is miscible with the water.

In the process impregnating in accordance with the present invention, an organic flavorant is introduced into a hulled cereal grain by contacting such grain with such flavorant (as herein described) while maintaining a temperature in the range of from about 60 to 200° F. for a time sufficient to introduce into such grain at least an organoleptically detectable taste of such flavorant.

As indicated above, the time/temperature relationship is such that substantially no apparent change in the starting (initial) hull (pericarp) structure of the grain occurs during contacting (that is, the hull is not cracked, broken, removed, or the like) as shown for example by visible inspection (under magnification if desired).

Preferably, gelatinization of endosperm starch is minimized since cooking of endosperm starch and/or alteration of hull structure are now believed to be generally undesirable results for a product of this invention, particularly in the case of the presently preferred product, popcorn.

Preferably such contacting temperature is maintained in the range of from about 65° to 135° F.

The contacting between flavorant and hulled grain is continued for a time which is at least sufficient to introduce into the resulting hulled cereal grain at least a sufficient quantity of such flavorant to produce an organoleptically detectable taste therein. Preferably, the quantity so introduced is organoleptically excessive relative to the taste of the flavor in a natural food product which such flavorant is intended to resemble or simulate.

Such a flavorant impregnated hulled grain product is characteristically an intermediate which is suitable for further processing to produce an edible food. The reason for the above indicated taste preference is that, when the flavorant impregnated grain is duly used, such treated grain is heat processed and typically becomes expanded, and the total amount of flavorant initially present becomes diluted. Obviously, but preferably, the amount of flavorant employed in (impregnated into) a grain such as popcorn or other hulled cereal grain being treated in accordance with the present invention is such that the amount of flavorant so introduced into the grain is such that a normal or desired product flavor taste is achieved after the product has been prepared for consumption. The achievement of a particular taste in a given grain structure obviously is a matter of taste or choice. Taste can vary widely according to the desires of the user and other factors, and so no exact general information regarding the quantitative level of flavorant can be stated here for all individual products.

When an internally flavored grain product is processed for final consumption, some flavorant tends to be lost through volatilization, but, even so, the final product preferably retains a sufficient quantity of flavorant to produce a desirable taste.

While the amount of flavorant impregnated can vary greatly, it is now speculated that the typical quantity present could range typically from about 1 to 15 parts by weight of flavorant per each 100 parts by weight of grain although larger and smaller quantities can be used without departing from the spirit and scope of this invention. Some loss of flavorant in processing of a product prepared by the present invention is believed possibly to be desirable. For example, in the case of popcorn, some loss of a flavorant through volatilization during popping is apparently desirable in order to improve the gustatory (olefactory) appeal of the popped corn through distribution of a favorable aroma throughout the region wherein the popcorn is being popped. Similar considerations typically apply in various other final food step processing of the flavorant impregnated hulled cereal grain of this invention.

Certain minor losses of impregnated flavorant may tend to occur during washing and drying (as hereinbelow indicated), and, consequently for this reason also it can be desirable to impart a greater than normal taste concentration from a given flavorant in grain treated by the present invention, as those skilled in the art will appreciate. The production of any food stuffs containing a greater than normal concentration of flavorant is believed to be contrary to the prior art practices in the flavorant art and to itself apparently constitute an innovation in this invention.

Those skilled in the art will appreciate that while contacting between hulled cereal grain and flavorant in a treating composition to achieve impregnation is preferably conducted in the presence of an aqueous liquid carrier, as described above, such contacting can also be achieved under gas phase and even substantially solid state conditions provided the flavorant has a physical form or is suitably formulated so as to be able to penetrate the hulled grain under the particular time, temperature and pressure conditions employed. However, all of these contacting procedures except for that involving the aqueous treating composition using the teachings herein provided now appear to be impractical. Such other procedures are detrimental for various reasons. They can require so much time to effect a desired level of flavorant impregnation as to be practically useless. They can alter the structure of the grain interior, as by causing gelatinization or other permanent change in endosperm starch. They can damage the grain hull structure.

The impregnation (contacting) step may be carried out under pressure. In such case, the infusion/flavorant/grain mixture may be subjected to a pressure of from about 10 to 200 pounds per square inch as the kernels soak, if desired.

In one convenient contacting procedure, a concentrated flavorant solution, such as shown in Table IV, is diluted with water at a temperature of from 130° to 140° F. Then, the hulled cereal grain, such as popcorn or the like, is charged to the warm mixture. A present particularly preferred weight ratio of hulled cereal grain (popcorn) to liquid treating composition ranges from approximately 1:1 to 1:3.

After addition of hulled grain to such treating composition, the grain is preferably allowed to soak in the flavor infusion treating composition while maintaining a temperature preferably in the range of from about 65° to 135° F. under atmospheric pressure for a time extending from about about two hours to eight hours, the exact optimum time chosen in any given situation being dependant upon such variables as the type of flavorant composition being utilized, the amount of flavorant desired in the resulting treated grain after processing, and the like.

In a particularly preferred mode of practice, after a given batch contacting procedure recycling of treating composition is carried out. Depending on such contacting variables as: the amount of hulled grain treated in relation to the amount of treating composition, the type of hulled grain, the composition of the treating composition, the contacting conditions, and the like, the flavorant concentration in the treating composition diminishes. Therefore, fresh treating composition is admixed with recycled treating composition to maintain a desired level or concentration of flavorant(s) in the treating composition used for contacting. By maintaining the concentration of flavorant(s) in a treating composition within a chosen range, and by using constant contacting conditions from one batch of a hulled grain to the next, uniformity of flavor characteristics for a (in a) flavorant impregnated hulled grain product being produced by successive batches (or even continuously) are maintained (for example, in a commercial scale manufacturing operation).

Also, during contacting, gentle controlled agitation of hulled grain (that is, agitation under conditions that pericarp structure is not significantly damaged or altered) can be used to achieve a movement or flow of treating composition relative to surface portions of the hulled grain being so treated. Examples of such agitation means include sparging, vibrating, flowing, gentle, mechanical agitation, and the like.

After contacting is completed, the resulting such so contacted hulled grain is preferably washed in a liquid inert carrier (preferably fresh water) to remove residual flavorant from surfaces of such grain. The washing is preferably carried out using conditions which minimize extraction of flavorant from the grain and minimize damage to the pericarp (hull) structure of such grain.

Convenient washing temperatures range from about 60 to 200° F. with a present preference being temperatures in the range from about 65° to 135° F. Washing times, water flow rates, and other variables are selected dependant upon the equipment used and like factors. Short washing times with gently flowing water are presently preferred.

The wash water can be admixed with organic liquid carriers as above described, including ethanol and the like.

Washing is preferred in order to enhance storage stability of the product produced in accordance with the practice of the present invention. Residual surface contamination of flavorant on treated grain surfaces may interfere with achievement of desired organoleptic effects. For many end use purposes, however, washing is apparently not necessary or critical.

After contacting, and/or after washing (if washing is utilized), it is preferred to dry the resulting hulled grain in a gaseous environment at a temperature conveniently ranging from about 60° to 200° F. The drying is preferably carried out using conditions which minimize volatilization of flavorants introduced into the grain and which minimize damage to the hull structure of the grain.

Preferred drying temperatures ranging from about 65° to 135° F. Particularly when relatively volatile flavorants are employed, it has been found convenient (more preferred) to maintain drying temperatures below about 85° F.

Conveniently, the drying is carried out in flowing air, although, if desired, the drying can be carried out in a substantially inert gaseous atmosphere, such as an atmosphere comprised of nitrogen. Preferably, the gaseous atmosphere is dehydrated so as to reduce the moisture level thereof to as low a level as is conveniently possible. Drying times, gas flow rates and other variables are selected dependant upon the equipment used and like factors. Short drying times are generally preferred. Drying can be accomplished without washing if desired.

If desired, the drying can be carried out under reduced atmospheric pressure, for example, a pressure not above about 300 mm Hg, thereby to promote early removal of water vapor.

Drying is preferably employed in the practice in the present invention when the previously impregnated grain is to be stored interveningly before use. However, as in the case of an optional washing step, if the treated grain is to be used directly after impregnation under conditions where grain having a relatively high moisture content is not a problem, then the drying step is not necessary. For example, in the case of popcorn, or other grain which is to be popped (such as wheat or sorghum), drying may be necessary in order to reduce the moisture content of the flavorant impregnated grain down to a level in the moisture range where popping can be achieved.

When drying is carried out, such is typically conducted for a time sufficient to produce in the resulting product hulled grain a moisture content in the range broadly from about 7 to 20 weight percent based upon total weight of a so dried grain, the exact amount depending upon factors such as the intended end use application, although larger and smaller moisture contents may be satisfactory. A present preference is to produce a product having a moisture content falls in the range from about 11 to 17 weight percent (same basis).

Washing and drying, when employed, are preferably carried out under conditions such that substantially no gelatinization of grain endosperm starch occurs and substantially no change in pericarp structure occurs.

The following Table VIII teaches and illustrates preferred and more preferred moisture contents which can be associated with various hulled grain product internally flavored with an organic flavorant in accordance with the teachings of the present invention. Those skilled in the art will realize that more or less moisture can be present in a given product without departing from the spirit and intent of the present invention.

TABLE VIII

Moisture Content of Internally Flavored Grain

| Treated Hulled Grain | Moisture Content (wt. % total grain basis) | |
| --- | --- | --- |
| | Preferred | More Preferred |
| Corn | 10.0–19.0 | 12.0–16.0 |
| Popcorn | 11.0–17.0 | 13.0–16.0 |
| Wheat | 9.0–19.0 | 10.5–13.0 |
| Oats | 8.0–15.0 | 9.5–12.0 |
| Rye | 9.0–17.0 | 10.0–13.0 |
| Barley | 9.0–17.0 | 10.5–14.0 |
| Rice | 9.0–16.0 | 10.0–13.0 |
| Sorghum | 9.0–17.0 | 10.5–14.5 |
| Triticale | 9.0–16.0 | 11.0–14.0 |
| Millet | 9.0–14.0 | 10.0–12.0 |

The microbial stability of an internally flavored hulled cereal grain prepared in accordance with the teachings of the present invention apparently depends heavily on its moisture content which is the case with conventional grain (see *Postharvest Biology and Biotechnology*, Herbert O. Hultin and Max Milner: Food and Nutrition Press, Inc., Westport, Conn., 1978). It is presently believed and preferred that the moisture content of internally flavored popcorn of the present invention for maximum shelf life properties be approximately 13.6 to 14.6 weight percent. When, for example, flavorant impregnated popcorn kernels having an initial moistre content of about 14.0 weight percent are stored in a hermetically sealed container, then the shelf life is believed presently to be about nine to twelve months.

Internally flavored popcorn prepared and packaged for microwave cooking is preferably handled so as to provide elevated moisture contents in comparison to, for example, glass packaged popcorn for best popping quality. However, with such elevated moisture contents, microbial growth can destroy product stability in a relatively short storage time, as those skilled in the art will appreciate. The prior art technology relating to package design for microwave popcorn storage and marketing to prevent escape of moisture and avoid air transfer can be employed for the internally flavored hulled cereal grain of the present invention, as well as low temperature (below 32° F.) storage to retard microbial growth in impregnated popcorn because of the elevated moisture contents. It is presently preferred that the moisture content of microwave popable internally flavored popcorn of the present invention falls in the range of from about 14.5 to 15.5 weight percent.

To produce internally flavored popcorn, it is presently preferred to employ a series of processing steps as follows: A starting popcorn having a moisture content as shown in Table I above is contacted with an aqueous flavorant treating composition as described in Table V above while maintaining a contacting temperature ranging from about 70° to 130° F. for a time sufficient to introduce into such popcorn a quantity of flavorant which is sufficient to produce therein an organoleptically detectable taste of excessive flavorant compared to a natural material containing a flavor like that of the flavorant. No substantial change in pericarp occurs, and preferably no substantial change in endosperm starch and in pericarp occurs. Preferably such a flavorant aqueous treating composition can contain on a 100 weight percent basis from about 5 to 25 weight percent of organic flavorant with the balance up to 100 weight percent comprising water. Other components may be present as described, for example, in Table V and the accompanying text.

In flavoring popcorn internally in accordance with this procedure, the aqueous treating composition preferably contains from about 6 to 18 weight percent of dissolved edible ionic salt.

Also, such aqueous treating composition preferably contains from about 1.0 to 4.0 weight percent of at least one edible dissolved surfactant as described above.

Also, such aqueous treating composition preferably additionally contains from about 0.10 to 2.0 weight percent of at least one edible colorant. Preferably the colorant is so chosen as to achieve, as described above, a coloration which approaches that of a natural product which the flavorant in the expanded popcorn resembles.

After the contacting, the resulting so treated popcorn is preferably washed with aqueous liquid, preferably fresh water, preferably below 98° to remove therefrom any residual such flavorant from the surfaces thereof in accordance with the washing teachings thereinabove provided.

Thereafter, the resulting so washed internally flavored popcorn is air dried at a temperature preferably below about 90° F. until the moisture content thereof is reduced to a level where such so dried popcorn is popable (see Table IX). Thus, preferably, the moisture content of such so dried popcorn ranges from about 13 to 16 weight percent on a 100 weight percent total popcorn basis.

In order to achieve and enhance a desired flavor in a given impregnated popcorn produced by the practice of the present invention, it is desirable and presently preferred to employ a flavorant system in a concentrate composition which contains an abnormally high concentration of flavorants of both volatile and non-volatile flavorants (relative to usual prior art practices used in flavoring). For example, a typical concentrate butter flavorant composition specially formulated for use in a treating composition in accordance with the practice of this invention is shown in the following Table X.

While the butter flavorant formulation of Table II (above) can be used, the product popped flavored popcorn, for example, made therewith appears to have a relatively weak butter odor and taste.

TABLE IX

Example of A Presently Preferred Organic Liquid Butter Flavorant Concentrate Suitable For Popcorn Impregnation

| Component | Parts By Weight |
| --- | --- |
| Diacetyl | 10 |
| Capric Acid | 4 |
| Lipolyzed Butter Oil (Spray Dried) | 40 |
| Caproic Acid | 2 |
| 2-Acetyl Pyrazine | 1 |
| Delta Decalactone | 1 |
| Starter Distillate | 18 |
| Propylene Glycol As Solvent | 19 |

The type of concentrated flavorant system above described and illustrated in Table X is typically, as indicated, initially in the form of a concentrated flavorant composition which is then added to water to produce a treating composition at the time of treatment. Such treating composition can then have the ionic salt surfactant and/or colorant added thereto if desired.

In contacting hulled cereal grain in accordance with the present invention, it has been found desirable to include in the treating composition a nutritive and/or non-nutritive sweetening agent as one specialized and preferred class of organic flavorants. A sweetening agent produces a sweet taste, not an organoleptic response and so sweetening agents are physiologically distinct from and are not equivalent to organic flavorants which are organoleptically detectable. In general, a sweetening agent appear to enhance desirable flavor characteristics in a product treated hulled grain and also to enhance the introduction of the flavorant into the hulled cereal grain during impregnation thereof as described.

For sweet tasting as well as fruit flavored flavorant systems, for example, a concentrated aqueous flavor infusion solution (for treating composition), such as described above in Table IV, can also be prepared to have, for example, a greater percentage of water and a lower percentage of flavor oils with the addition thereto of nutritive and non-nutritive sweetening agents, and still achieve approximately the same organoleptic taste results. The water present in such a treating solution containing nutritive or non-nutritive sweetener can range from about 70 to 85 weight percent (preferably about 78 to 83 weight percent) and the flavorant may be present in an amount ranging from about 14 to 19 weight percent (preferably from about 15 to weight percent), with the quantity of sweetening agent present agent ranging from about 0.5 to 10.0 weight percent (and preferably from about 1.0 to 5.0 weight percent), all on a total weight percent treating composition basis. When a nutritive sweetener is used, such as sucrose, or the like, it is presently preferred to add a minimum of at least 10 weight percent of such present in a treating composition on a total composition weight basis. Although sugar (e.g., sucrose or glucose) is the presently preferred sweetener, artificial sweeteners can be used as shown in Table X:

TABLE X

Saccharin
Aspartame
Glycerrizin

TABLE X-continued

Cyclamates
Xylose
Sorbitol
Sucrose
Glucose
Fructose
Mannose
Lactose

The introduction or impregnation of hulled cereal grain with flavorant in accordance with the teachings of the present invention occurs by a mechanism which is not clear at the present time. It is also theorized (and there is no intent herein to be bound by theory) that the flavorant enters into the structure of the hulled cereal grain. It is theorized that osmotic transfer and grain dehydration may be involved, with the moisture which would normally be absorbed into the outer wall of an individual grain being partially substituted by flavorant. The amount of the substitution would theoretically be sufficient to provide a sufficient concentration of flavorant in the impregnated product to produce a desired flavor after popping, expanding, or the like.

Rates of impregnation of flavorant can be regulated through selection of flavorant, salt concentrations, flavorant concentration in treating carrier, contacting times and the like.

At the absence of adequate equipment, drying can be accomplished using direct sunlight with the impregnated grain preferably spread out for maximum light exposure.

As indicated above, organic flavorants containing more than three (e.g. at least four) carbon atoms per molecule are employed in the practice of the present invention. There are various reasons for this.

Thus, for one reason, the lower molecular weight (less than four carbon atoms per molecule) organic flavorants are undesirable for use in the present invention because of their low volatility and pungent aroma characteristics. Potential consumers of internally flavored popcorn and other expanded food snacks evidently will object to an extensive (strong) aroma in the vicinity of an expandable or popable food such as popcorn during popping thereof.

Organic flavorants which contain less than about four carbon atoms per molecule tend to be volatile and to have a pungent odor associated with them. For example, acetic acid (which has an odor resembling sauerkraut) acetaldehyde (which has a chemical odor resembling plastic or vinyl) and like compounds which have two carbon atoms per molecule are flavorant compounds that tend to have an odor/flavor which is strongly pungent. A three carbon atom containing flavorant compound such as propionic acid (which has a taste resembling that of sour cheese and vinegar) is not only pungent, but can, give undesirable odor/taste effects particularly when in high concentrations. Other lower molecular weight materials, such as ethyl amine (which is a relatively highly volatile material that produces an odor such as is associated with rancid fish) have similar characteristics.

Aside from the characteristically pungent odor, the associated low volatility characteristics of such lower molecular weight organic flavorants can be regarded as being undesirable for use in the present invention. Thus, after organic flavorant is infused (impregnated) into hulled grain, such grain must be heat processed at temperatures which are sufficient to achieve substantially complete gelatinization of the endosperm starch in order to render such starch edible (digestable) by man. At heat processing temperatures, such lower molecular weight organic flavorants characteristically tend to be volatilized and thereby removed from the resulting cooked product. Therefore, to achieve a maximum concentration of flavorant composition in a given flavorant impregnated hulled and heat processed grain, it is desirable to use organic flavorants which contain four or more carbon atoms per molecule.

The carbon atom content of an organic flavorant is being used as a molecule size factor because the present state of the art does not, permit use of some other factor which might be more accurate as a means for separating organic flavorant compounds having low molecular weight characteristics from other flavorant compounds.

Those skilled in the art will appreciate that aroma and volatility of an organic flavorant are extremely difficult to correlate or associate with molecular weight, carbon content, boiling point, or like factors. In fact, aroma and volatility of a flavorant compound appear also to be associated (correlated) with various different features including the number and type of functional groups present in a compound's molecules, its molecular configuration, and perhaps other features. Indeed, taste is, of course, as yet an unpredicatble science where no direct correlation can be made between the exact structure or weight of a molecule and its taste, although experience does lead to certain rough correlations. The value of less than four carbon atoms per flavorant molecule is chosen herein as being the best means now known for eliminating from use in the present invention those flavorants which may have or are known to have undesirable aroma and volatility characteristics.

Organic flavorants which contain at least one carboxyl group per molecule, such as carboxylic acids (a class of organic compounds to which acetic acid and propionic acid, for examples, belong) can be distinguished from other classes of organic flavorants in the practice of this invention on the basis of dissociation constants. An exemplary list of carboxylic acids known to be organic flavorants is presented in Table XI below along with their respective dissociation constants in water (such constants being taken from the "Handbook Of Chemistry And Physics" Thirty-first Edition, and being for the first H):

TABLE XI

| Dissociation Constants Of Some Flavorant Carboxylic Acids | |
|---|---|
| Butyric | $1.48 \times 10^{-5}$ |
| Acetic | $1.75 \times 10^{-5}$ |
| Citric | $8 \times 10^{-4}$ |
| Propionic | $1.4 \times 10^{-5}$ |
| Lactic | $1.38 \times 10^{-4}$ |
| Formic | $1.76 \times 10^{-4}$ |
| Malic | $4 \times 10^{-4}$ |
| Fumaric | $1 \times 10^{-3}$ |
| Benzoic | $6.3 \times 10^{-5}$ |
| Isovaleric | $1.7 \times 10^{-5}$ |
| Isobutyric | $1.5 \times 10^{-5}$ |
| Oxalic | $6.5 \times 10^{-2}$ |
| Succinic | $6.6 \times 10^{-5}$ |
| Valeric | $1.6 \times 10^{-5}$ |
| Salicylic | $1.06 \times 10^{-3}$ |

It has been found that certain carboxylic acid group containing flavorants which have relatively high dissociation constants, such as propionic acid and acetic acid, can adversely affect flavorant impregnated hulled grain produced in accord with the teachings of this invention (for example, the popability of flavorant impregnated popcorn) particularly if present at levels sufficient to be organoleptically detectable. The reason(s) is (are) unknown. It is theorized that the high dissociation constants (low pH) associated with such carboxylic acids may be detrimental to the natural endosperm starch structure of popcorn; thus, such acids may possibly induce starch hydrolysis and convert starch into glucose and other by-products which ultimately may change, perhaps undesirably, the flavorant impregnated grain processing properties (such as popcorn popability) compared to the properties of the corresponding unimpregnated grain. Therefore, in the practice of the present invention if the flavorant is a carboxylic acid (that is, if not contains at least one carboxylic acid group per molecule) then such should not have a dissociation constant above about $1 \times 10^{-5}$ (for first H at 25° C.).

In addition to the differences based upon carbon content (volatility and pungency), and acidity (dissociation constants), flavorants containing more than three carbon atoms per molecule are desired generally for use and are preferred in preparing flavorant formulations for use in treating compositions for hulled grain for another reason. In connection with this reason, one must appreciate that in the preparation of organic flavorant compositions, it is common, and usually desired, to admix a so-called key flavorant material with other organic flavorant components, thereby to balance off a flavorant formulation and achieve a particular desired flavored character in the impregnated hulled grain.

In the practice of the present invention, it is considered unusual, surprising, and unexpected, that not only is the key flavorant transported through the hull of hulled grain, but also that the entire group of different organic flavorant agents comprising a flavorant composition is carried through the hull into the interior endosperm portions of a given grain in accordance with the present invention. Furthermore, this transfer is achieved without disruption, destruction, or apparent alteration of the hull wall. Transfer of a group of organic chemicals through grain hull walls has not been previously demonstrated or known to be achievable.

Evidently (based on present knowledge) the grain hull wall acts similarly to a dialysis membrane. In dialysis, a semipermeable membrane is positioned between two different fluids. Dissolved solids pass from the fluid wherein they exist in higher concentration through the membrane into the fluid wherein they exist in lower concentration. The osmotic forces involved are substantial. In the present situation, one of the fluids comprises a treating composition while the other solution comprises the moisture with dissolved solids present on the interior side of the grain hull. As is known, the rates of diffusion of small molecules are substantially greater than the rates of diffusion of large molecules. Macromolecules (such as starch or protein molecules) indeed do not pass through a semipermeable membrane at all. For example, the reported diffusion rates through previously known dialysis membranes are about 2.3 for sodium chloride, 7 for cane sugar, and from about 50 to 100 for various larger molecules.

Thus, in order to obtain diffusion of an entire flavorant composition into the interior of a hulled grain pass the hull wall, the diffusion rates of the respective individual flavorant compound components comprising the flavorant composition should be roughly within the same range. Therefore, flavorant chemicals of small molecular size (conveniently having less than about 4 carbon atoms per molecule based upon the present knowledge) are to be avoided since they would transfer through the hull wall at a substantially more rapid rate than larger flavorant molecules.

EMBODIMENTS

The present invention is further illustrated by reference to the following examples. Those skilled in the art will appreciate that other and further embodiments are obvious and within the spirit and scope of this invention from the teachings of these present examples taken with the accompanying specification.

Each of the hereinbelow identified types of hulled cereal grain employed as a starting material is believed to have a moisture content within the normal range identified in Table I above.

EXAMPLE A-J

A series of flavorant concentrate compositions are prepared. Each composition is made by blending the individual components together in a "lightening" mixer until homogeneity is achieved. Unless otherwise noted, each composition as blended is in the form of a liquid. Each such flavor composition is adapted for use in the practice of the present invention especially because of the circumstance that in each flavorant composition flavorant agents are present in higher concentration than are believed to be utilized in corresponding flavorant compositions known to the prior art.

EXAMPLE A—Butter

A flavorant concentrate is here employed whose composition is the same as in Table IX above but with the addition thereto of two parts by weight butyric acid and three parts by weight pyruvic acid.

EXAMPLE B—Pizza

| Ingredient | Parts |
|---|---|
| MSG | 2.0 |
| Ribotide | 0.5 |
| Soft Garlic Ext. | 0.3 |
| Black Pepper Oleoresin | 1.5 |
| Soft Onion Ext. | 0.4 |
| Oregano Oleoresin | 5.0 |
| Tomato Conc. | 70.0 |
| Diacetyl | 3.0 |
| Water | 18.0 |

EXAMPLE C—Cheese

| Ingredients | Parts |
|---|---|
| Enzyme Modified Cheddar Cheese | 25 |
| Enyzme Modified Parmesan Cheese | 25 |
| Oleoresin Black Pepper | 5 |
| Oleoresin Capsicum (250,000 units) | 3 |
| Diacetyl | 10 |
| Ungerer Artificial Cheddar Cheese 14674 | 15 |
| Propylene Glycol | 17 |

EXAMPLE D—Lemon

| Ingredients | Parts |
|---|---|
| Single Fold Lemon Oil, Cold Pressed | 18.0 |
| Orange Terpenes | 38.0 |
| Five Fold Lemon Oil | 5.0 |
| Citral | 2.5 |
| Firmenich Tetrarome Lemon Flavor | 14.5 |
| Ethanol | 13.0 |

This composition is mixed thoroughly and spray dried using gum acacia and conventional spray drying techniques.

EXAMPLE E—Toasted Coconut

| Ingredients | Parts |
|---|---|
| Ungerer Artificial Toasted Coconut Flavor 17829 | 100 |

EXAMPLE F—Sour Cream & Onion

| Ingredients | Parts |
|---|---|
| Powdered Onion | 40 |
| Ungerer Sol Spice Onion 5435 | 15 |
| Diacetyl | 10 |
| IFF Butter Flavor 08797 | 15 |
| Propylene Glycol | 10 |

EXAMPLE G—Savory

| Ingredients | Parts |
|---|---|
| Ungerer Natural Chicken Flavor 16008 | 20 |
| Ungerer Natural Beef Flavor 18220 | 35 |
| Cysteine - Hcl | 5 |
| Methional | 3 |
| Thiamine | 12 |
| Propylene Glycol | 25 |

EXAMPLE H—Bacon

| Ingredients | Parts |
|---|---|
| Ungerer Artificial Bacon Flavor 17891 | 55 |
| Oleoresin Capsicum (250,000 units) | 5 |
| Chili Powder | 10 |
| Fidco Bacon Flavor hydrolyzate | 30 |

EXAMPLE I—Caramel

| Ingredients | Parts |
|---|---|
| Ungerer Articifial Caramel Flavor 6132 | 60 |
| Ungerer Artificial Butterscotch Flavor 18108 | 15 |
| Diacetyl | 10 |
| IFF Butter Flavor 08797 | 10 |
| Starter Distillate 15 | 5 |

EXAMPLE J—Cherry

| Ingredients | Parts |
|---|---|
| Bitter Almond Oil | 50 |
| Benzaldehyde | 5 |
| 102 Vanilla Bourbon | 10 |
| Eugenol | 3 |
| Ethanol | 30 |

-continued

| Ingredients | Parts |
|---|---|
| Maqui Extract | 2 |

EXAMPLES 1.1–1.0

Each of the flavorant compositions of Examples A through J above is formed into a flavorant concentrate composition. Each such concentrate composition is shown in TABLE XII below. In the case of the Examples identified as 1.1, 1.3, 1.5, 1.6, 1.7, and 1.9, the organic liquid used is propylene glycol. In the case of Example 1.4, the lemon flavorant concentrate, no organic liquid is employed; rather the 67.5 parts by weight indicated is comprised of gum acacia, a solid in powder form. In the case of Example 1.10 the organic liquid is ethanol.

In these concentrates, the colorant for Example 1.1 is annato color. In the case of concentrate 1.2, the colorant is red beet color. In the case of concentrate 1.3, the colorant is lactoflavin yellow. In the case of flavorant 1.4, the colorant is yellow number 5. In the case of flavorant 1.5, the colorant is caramel.

In the case of colorant 1.7, the colorant is caramel. In the case of concentrate 1.8, the colorant is beta carotene. In the case of concentrate 1.10, the colorant is maqui extract. In Table XII, the columns headed as "Flavorant," "Water," "Organic Liquid," and "Colorant" represent parts by weight.

EXAMPLE 1

TABLE XII

Flavorant Concentrate Compositions

| Ex No | Flavor Example | Flavorant | Water | Organic Liquid | Colorant |
|---|---|---|---|---|---|
| 1.1 | Butter | 80.0 | — | 19.0 | 1.0 |
| 1.2 | Pizza | 82.0 | 18.0 | — | 0.5 |
| 1.3 | Cheese | 78.0 | 8.0 | 12.0 | 2.0 |
| 1.4 | Lemon | 31.0 | — | 67.5 | 1.5 |
| 1.5 | Toasted Coconut | 62.0 | — | 37.0 | 1.0 |
| 1.6 | Sour Cream & Onion | 64.0 | — | 36.0 | — |
| 1.7 | Savory | 65.0 | 18.0 | 23.5 | 3.5 |
| 1.8 | Bacon | 74.0 | 14.0 | — | 2.0 |
| 1.9 | Caramel | 55.0 | — | 45.0 | — |
| 1.10 | Cherry | 68.0 | — | 30.0 | 2.0 |

EXAMPLES 2.1–2.11

Treating compositions (aqueous) are prepared as follows: Each of the flavor concentrate compositions of Examples 1.1–1.10 is formed into a treating composition suitable for the practice of the present invention by addition to a concentrate composition of water, and also, in certain cases, of organic carrier. The compositions of the resulting treating compositions are shown in Table XIII below.

In each of the treating compositions shown in Table XIII, the salt employed is sodium chloride. Also, the surfactant employed is "Tween 20", a polyoxyethylene nonionic surfactant available commercially from Atlas Chemicals. In those treating compositions wherein colorant is added, as shown in Table XIII, the colorant added in each composition is identical to the colorant identified above in relation to Table XII.

EXAMPLE 2

TABLE XIII

Treating Compositions (Parts By Weight)

| Ex No | Flavor Example | Ex. No | Concentrate | Water | Carrier | Salt NaCl | Surf | Color |
|---|---|---|---|---|---|---|---|---|
| 2.1 | Butter | 1.1 | 21.0 | 72.0 | — | 6.8 | — | 0.2 |
| 2.2 | Cherry | 1.10 | 22.0 | 74.0 | — | — | — | 4.0 |
| 2.3 | Pizza | 1.2 | 14.0 | 61.8 | — | 18.0 | 2.0 | 0.2 |
| 2.4 | Cheese | 1.3 | 32.0 | 46.0 | — | 14.5 | 2.0 | 1.5 |
| 2.5 | Lemon | 1.4 | 7.0 | 66.0 | 14.0 | 10.0 | — | 0.2 |
| 2.6 | Sour Cream & Onion | 1.6 | 23.0 | 61.0 | — | 16.0 | — | — |
| 2.7 | Toasted Coconut | 1.5 | 14.0 | 72.0 | — | 10.0 | 1.0 | 3.0 |
| 2.8 | Bacon | 1.8 | 36.0 | 48.0 | — | 12.0 | 2.0 | 2.0 |
| 2.9 | Caramel | 1.9 | 8.0 | 84.0 | — | 6.0 | 2.0 | — |
| 2.10 | Butter | 1.1 | 21.0 | 78.8 | — | — | — | 0.2 |
| 2.11 | Lemon | 1.4 | 10.0 | 63.0 | 14.0 | — | — | 0.2 |

EXAMPLES 3.1–3.18

Each of the treating compositions of Examples 2.1 to 2.11 is used for contacting purposes with a hulled cereal grain under contacting conditions as more particularly specified below in Table XIV.

In all of the Examples 3, except for Examples 3.5 and 3.17, liquid phase contacting conditions are employed; that is, aqueous conditions are employed during contacting between grain and treating liquid. In the case of Example 3.5, the kernels of grain (corn) are covered initially with the concentrate composition corresponding to Example 1.3. Next, steam is bubbled through this concentrate composition. The steam temperature was approximately 240° C. at ambient pressure. Some steam condensation occurred. The product produced at the end of contact by this procedure was swollen. It did contain impregnated flavorant but organoleptic testing revealed a weak flavorant within the treated corn.

In the case of Example 3.17 the procedure involved taking the treating composition of Example 2.9 and depositing such in an autoclave. To this liquid is added a measured amount of popcorn with the corn being deposited within an open topped glass vessel (a beaker) within the autoclave. The autoclave is then sealed and heat is applied until the treating solution is vaporized and the internal temperature within the autoclave is approximately 240° F. under atmospheric pressure. This temperature is then maintained for approximately one-half hour. Thereafter, heat is removed and the autoclave is vented. The product resulting is removed and found to be sufficiently dry to avoid any need for a subsequent drying step. No washing of this product is undertaken. The product displayed an organoleptically detectable odor of caramel, and, when this product is popped in the normal way, the popped kernels contained a caramel flavor. However, the product treated kernels are enlarged or swollen relative to the untreated starting popcorn. The popping efficiency was less than the popping efficiency of the untreated control. Also, the product appears to have good shelf life stability characteristics.

In all of the liquid phase contacting examples, when contacting is completed, the liquid is separated from the resulting treated kernels. In all cases, the resulting grain is swollen relative to the starting (untreated) control material.

EXAMPLES 3.1–3.17 depositing the resulting contacted grain product in a strainer and spraying fresh tap water for a period of time ranging from 2 to 15 minutes under ambient temperature conditions. The conditions of washing are shown in Table XV below for each procedure. Washing temperatures below 200° F. appear to be preferable.

EXAMPLES 4.1–4.20

TABLE XV

| Ex No | Start. Ex. No. | Treat. Comp. | Treated Grain | Product Washing Wash Treatment | Temp °F. | Time | Comments |
|---|---|---|---|---|---|---|---|
| 4.1 | 3.1 | 2.1 | Corn | Water Spray | 60 | 10 | A |
| 4.2 | 3.2 | 2.1 | Rice | Water Spray | 60 | 5 | A |
| 4.3 | 3.13 | 2.1 | Rice | Water Spray | 100 | 10 | Too Gummy When Cooked |
| 4.4 | 3.4 | 2.1 | Corn | Water Spray | 80 | 5 | G |
| 4.5 | 3.5 | 2.2 | Corn | Water Spray | 60 | 2 | A |
| 4.6 | 3.6 | 2.4 | Corn | Water Spray | 80 | 15 | B |
| 4.7 | 3.7 | 2.4 | Corn | Water Spray | 80 | 15 | B |
| 4.8 | 3.8 | 2.4 | Corn | Water Spray | 125 | 10 | E |
| 4.9 | 3.9 | 2.6 | Corn | Water Spray | 60 | 5 | A |
| 4.10 | 3.10 | 2.6 | Corn | Water Spray | 80 | 10 | A |
| 4.11 | 3.11 | 2.6 | Corn | Water Spray | 100 | 15 | A |
| 4.12 | 3.12 | 2.6 | Corn | Water Soak | 100 | 15 | C |
| 4.13 | 3.13 | 2.6 | Corn | Water/Alc. Soak | 60 | 15 | A |
| 4.14 | 3.14 | 2.7 | Corn | Water Spray | 60 | 3 | A |
| 4.15 | 3.15 | 2.7 | Corn | Water Spray | 60 | 10 | A |
| 4.16 | 3.16 | 2.9 | Corn | Steam Spray | 240 | 15 | D |
| 4.17 | 3.3 | 2.8 | Barley | Water Spray | 60 | 3 | Strong Flavor & Good Expansion |
| 4.18 | 3.14 | 2.8 | Barley | Water Spray | 100 | 10 | Strong Flavor but Poor Expans. |
| 4.19 | 3.15 | 2.1 | Corn | Alcohol Soak | 60 | 20 | E |
| 4.20 | 3.7 | 2.9 | Corn | None | — | — | F |

*A = Strong Flavor and Good Popping Volume
B = Weak Flavor and Good Popping Volume
C = Strong Flavor and Fair Popping Volume
D = Poor Flavor and Mediocre Popping Volume
E = Weak Flavor and Poor Popping Volume
F = Weak Flavor and Mediocre Popping Volume
G = Strong Flavor

TABLE XIV

| Ex No | Treating Composition | Hulled Cereal Grain Treated | Contacting of Hulled Cereal Grain With Treating Composition Contact Phase | Temp °F. | Hrs. | Comments |
|---|---|---|---|---|---|---|
| 3.1 | 2.1 | Popcorn | Liquid | 75 | 24 | Strong Flavor |
| 3.2 | 2.1 | Rice | Liquid | 75 | 8 | Strong Flavor |
| 3.3 | 2.1 | Barley | Liquid | 75 | 4 | Weak but Detect. |
| 3.4 | 2.1 | Popcorn | Liquid | 130 | 8 | Weak Flavor & Poor Popping Volume |
| 3.5 | 2.1 | Popcorn | Gas | 240 | ½ | Very Weak Flavor |
| 3.6 | 2.2 | Popcorn | Liquid | 80 | 12 | Strong Flavor |
| 3.7 | 2.3 | Popcorn | Liquid | 140 | 24 | Strong Flavor Poor Popping Volume |
| 3.8 | 2.3 | Popcorn | Liquid | 80 | 12 | Strong Flavor Good Popping Volume |
| 3.9 | 2.4 | Popcorn | Liquid | 75 | 8 | Weak Flavor |
| 3.10 | 2.5 | Popcorn | Liquid | 75 | 12 | Strong Flavor |
| 3.11 | 2.5 | Popcorn | Liquid | 75 | 6 | Strong Flavor |
| 3.12 | 2.7 | Popcorn | Liquid | 75 | 24 | Very Str. Flavor |
| 3.13 | 2.7 | Rice | Liquid | 75 | 10 | Very Str. Flavor |
| 3.14 | 2.8 | Barley | Liquid | 75 | 24 | Strong Flavor |
| 3.15 | 2.9 | Popcorn | Liquid | 75 | 24 | Very Str. Flavor |
| 3.16 | 2.9 | Popcorn | Liquid | 75 | 8 | Strong Flavor |
| 3.17 | 2.9 | Popcorn | Gas | 240 | ½ | Weak Flavor |

EXAMPLES 4.1–4.20

Each of the resulting contacted product grains produced in Examples 3.1–3.16 is subjected to a washing with fresh water. The procedure in each case involved

EXAMPLES 5.1–5.8

Each of the washed products of Examples 4.1–4.20 is dried. Particular drying conditions are shown in Table XVI below for certain of the washed products. For the remainder of the washed products, drying is accomplished under ultraviolet light with the washed grain being spread out on a tray; the drying temperature is believed to have been less than about 90° F. Drying is accomplished in a time less than four hours.

The drying methods shown in Table XVLI are found to be satisfactory except for convection oven drying and steam spray drying which for presently unknown reasons appear to produce a popcorn product having poor popability. Drying temperatures below 200° F. appear to be preferable.

The dried product from Example 4.19 is found to display inferior popability with the popped (expanded) kernels being subnormal in size compared to normal popped corn. The reason for this aberration is unknown, but it is theorized that, since this product was prepared using ethanol as the carrier (with minimal water being present therein), the alcohol may possibly have dehydrated the corn kernels or reacted therewith.

EXAMPLE 6

Butter Flavored Popcorn Kernels

The following treating composition is prepared:

| Component | % by Wt. |
|---|---|
| Water | 72.0 |
| Compounded Pwd. Butter Fl. | 19.0 |
| Diacetyl. liquid | 2.0 |
| Sodium Chloride | 6.8 |
| Oil of Marigold | 0.2 |

To this infusion treating composition is added dried popcorn kernels having an estimated moisture content of about 13.5 at a ratio of 1:1 by weight. The kernels are then allowed to soak at a constant temperature of 80–110 degrees F. for a minimum of 2 hours and typically for 8 hours. Upon completion of this treatment the kernels are removed from the treating solution and washed with cold (about 60° F.) deionized water. The flavored kernels are then allowed to dry on drying trays at temperatures about 80° F. but not to exceed 100 degrees F. for 1 to 3 hours or until the internal moisture content is reduced to at least 14.5% as shown in Table XI above.

EXAMPLE 7

Fruit Flavored Popcorn Kernels

The following treatment composition is prepared:

| Component | % by Wt. |
|---|---|
| Water | 68.0 |
| Spray Dried Bitter Almond Oil | 16.0 |
| Spray Dried Maqui Extract | 5.0 |
| Sodium Chloride | 7.0 |
| Spray Dried Anthocyanin | 4.0 |

To this treating composition is added dried popcorn kernels having an estimated moisture content of about 13.5 corn kernels at a ratio of 1:1 by weight. The kernels are allowed to soak as described above in Example 6 for at least 4 hours to insure proper flavor and color incorporation followed by drying as described in Example 6.

EXAMPLE 8

Sweet Flavored Popcorn Kernels

For sweet flavored as well as fruit flavored systems at treating composition can also be prepared from the procedure of Example 2 to produce sweet internally fruit flavored popcorn. Preferably, water can be present in amounts from 70–85% by weight, and preferably 70–80% by weight in the treating solution. The flavorant may be present in from 14–19% weight, and preferably from 15–17% by weight, all on a 100 weight percent treating composition basis. The sweetening agent is present at from 0.5–12.0% by weight and preferably 10.0 by weight (same basis). With this change the procedures outlined above are used to produce sweetened popcorn kernels.

Well known sweetening agents are acceptable for the process of this invention including the following:

| | |
|---|---|
| Saccharin | Sucrose |
| Aspartame | Glucose |
| Glycerrizin | Fructose |
| Cyclamates | Mannose |
| Xylose | Lactose |

This method for providing internally flavored popcorn kernels is useful not only in the retail popcorn market but also in the microwave popcorn market, wherein the moisture content is maintained at 15–16% for packaging.

EXAMPLE 9

Pizza Flavored Popcorn Kernels

The following aqueous flavor antimicrobial (including antifungal) infusion mixture (treating composition) is prepared:

| Component | % by wt. |
|---|---|
| Water | 63.8 |
| Sodium Chloride | 18.0 |
| Color (Anthocyanins) | 0.2 |
| Pizza Flavor | 14.0 |
| Ingredient | Parts |
| MSG | 2.0 |
| Ribotide | 0.5 |
| Soft Garlic Ext. | 0.3 |
| Black Pepper Oleoresin | 1.5 |
| Soft Onion Ext. | 0.4 |
| Oregano Oleoresin | 5.0 |
| Tomato Conc. | 70.0 |
| Diacetyl | 3.0 |
| Water | 18.0 |

Antimicrobial/Antifungal Component 4.0 (compounded as):

| Ingredients | Parts |
|---|---|
| Rosemary Ext. | 85.0 |
| Bay Oil Ext. | 8.0 |
| Sage Oil Ext. | 7.0 |

To this treatment composition is added dried popcorn kernels, at a ratio of 1:2 by weight. The kernels are allowed to soak at a constant temperature of 75°–90° F. for a minimum of 1 to 2 hours and typically for 8 hours or longer. The kernels are thereafter removed from the treatment composition and washed with cold (temperature of about 60° F.) deionized water. The washed kernels are then allowed to dry on drying trays in drying ovens. Alternatively, drying is carried out on drying trays in the presence of (under) UV lights. Drying temperatures do not exceed 100° F. and drying is accomplished in 1 to 4 hours. The moisture content is reduced to 14.0% minimum.

EXAMPLE 10

Cheese Flavored Popcorn Kernels

The following flavor-antimicrobial (including antifungal) treating composition is prepared:

| Component | % by wt. |
|---|---|
| Water | 46.0 |
| Sodium Chloride | 18.0 |
| Extra Sharp Cheddar Cheese | 23.0 |
| Enzyme Modified Cheese Conc. | 7.0 |
| Compounded Butter Flavor | 2.0 |
| Antifunal Component | 4.0 |
| Compounded as Ingredients | Parts |
| Oleoresin Black Pepper | 20 |
| Rosemary Ext. | 70 |
| Cinnamic Aldehyde | 2 |
| Cumin Oil Ext. | 5 |
| Basil Oil Ext. | 3 |

To prepare the cheese slurry for optimal flavor penetration into the hulled cereal kernel a mixture of 2.0% Disodium Phosphate, 35% water, and 63% extra sharp soft cheddar cheese by weight is first mixed continuously for 20-25 minutes at 140-185 degrees F. to provide a smooth solubilized slurry prior to contact. If desired, this cheese slurry can be further compounded to incorporate a variety of other cheese blends (Blue, Swiss, Limburger, etc.).

To this infusion composition is added dried popcorn kernels (having an estimated moisture content of 13.5) at a ratio of popcorn to total treatment composition of 1:2 by weight. The kernels are allowed to soak as described in Example 10 for at least four hours at ambient temperatures to insure proper flavor-preservative incorporation, followed by washing and drying as described in such Example.

EXAMPLE 11

Lemon Flabored Popcorn Kernels

The following flavor/antifungal aqueous treating composition is prepared:

| Component | % by weight |
|---|---|
| Water | 66.00 |
| Sodium Chloride | 10.00 |
| Color (Anthocyanins) | 0.20 |
| Powdered Lemon Flavor | 21.00 |
| Citronellal | 2.80 |

To this mixture is added dried popcorn kernels at a popcorn to total treatment composition ratio of 1:2 weight. The kernels are allowed to soak at a constant temperature of 100° F. for a minimum of 1 to 2 hours and typically for 8 hours or longer. The kernels are removed from the treatment solution and washed with cold (about 60° F.) deionized water. The kernels are then allowed to dry on drying trays in drying ovens. Alternatively, drying is carried out on drying trays in the presence of (under) UV lights. Drying temperatures do not exceed 100° F. and drying is accomplished for 3 to 6 hours or to an optimum moisture content of 14.2%.

This method provides a high moisture, internally flavored popcorn kernel containing an internal antimicrobial/antifungal stabilizer. It provides a kernel with moisture contents of 13.8-16.5%, microbially stabilized to provide improved product a shelf life in non-hermetically sealed containers. This type of high moisture stabilized flavored popcorn is not only useful to the retail and institutional popcorn-snack market but also is extremely important to the microwave popcorn market. This method for applying flavor and internal preservative action to hulled cereal kernels is also useful for other hulled cereal food items such as rice, cereals, sesame seeds, and other grains.

EXAMPLE 12

An onion flavorant concentrate formulation is prepared having the following approximate composition:

| Onion Flavorant Concentrate | |
|---|---|
| Ingredients | Parts |
| Cooked Onion Powder | 60 |
| Salt | 10 |
| MSG | 5 |
| Onion Oil | 10 |
| Water | 15 |

In preparation, the onion powder was sauted with the other components. This concentrate is in the form of a paste at room temperature and pressure.

This concentrate is then blended with 10 parts by weight of cornstarch powder and about 4 parts by weight of alginate gum to produce a semisolid gel. This gel was thixotropic because when a temperature was above about 80° F. it became a liquid. When in a form of a liquid, and in such form a 1:1 weight ratio of gel to popcorn is prepared. The gel is then permitted to cool to room temperature and solidified. The composite mixture is maintained at room temperature conditions for approximately 24 hours after which time the mixture is reheated to a temperature of approximately 85° F. and the liquid is decanted from the popcorn. The popcorn is then washed in clear running tap water for approximately 15 minutes after which the popcorn is dried under ultraviolet light in a tray for approximately six hours. During drying, the temperature of the popcorn did not exceed about 90° F.

Thereafter, the popcorn is popped and an organoleptically detectable weak taste of onion is found to be present in the popped kernels.

The foregoing method of impregnation is to be contrasted with a procedure, that popcorn is dispersed in a cake of grease, lard, or the like for storage. If a small amount of flavorant is present in the lard during such storage (typically the amount of flavorant would be under about 1 part by weight for each 100 parts by weight of the lard or grease. Such a system, on storage for a period of time in excess of, for example, about thirty days, followed by separation of the grease or lard followed by washing, drying, and popping of the popcorn evidently does not result in product popcorn containing an organoleptically detectable quantity of the flavorant.

PRODUCT APPLICATIONS

I. Beverages

EXAMPLE I.1 Tea

An internally flavored barley is flavored and prepared as shown above in Example 7 which contains a commercially available bitter almond flavor. After washing and drying, the resulting internally flavored hulled barley is expanded by frying in the presence of vegetable oil. This resulting expanded product is then ground to produce particles having an average size of less than about 1 millimeter in average diameter. Thereafter the particles are spray coated in a V-blender with an edible shellac (or the like) to provide slow flavor release when subsequently hydrated.

When the resulting product is extracted in a tea bag in hot freshly boiled water a flavored beverage results similar to commercially available flavored teas.

Those skilled in the art will appreciate that alternative flavorant system can be employed.

I.2 Coffee

An internally flavored and colored hulled barley is prepared by the teachings of this invention and is then expanded by the foregoing procedure. Grinding as described above, then follows. The particle size of ground product is approximately that of ground coffee. This resulting system serves as a master batch which is admixed with ground coffee beans to provide a flavored coffee product.

I.3 Cocoa

The procedure of Example 1 I.1 is repeated except that the flavorant used is that of chocolate. When blended with dehydrated milk solids and sugar, a cocoa product is produced.

I.4 Whey

Whey is partially caramelized and dried to produce a free flowing particulate material. A internally flavored barley prepared as described in Example I.1 is prepared and expanded and ground. The internally flavored barley powder is admixed with the caramelized whey to produce a non-caffeinated beverage concentrate.

II. Confections

II.1 Chocolate Flavored Candy

An internally flavored popcorn is prepared, such as described above in Example 11. This popcorn is popped and thereafter crushed and ground to produce particle sizes less than about 1/10 millimeter each. To the powdered product so produced water, corn syrups, solids, binders, and nonfat dry milk is added, in accordance with the following formulation:

| Low Caloric Confectionery Product | |
|---|---|
| Ingredients | Parts |
| Internally Flavored Popcorn (Popped & Crushed) | 40 |
| Water | 20 |
| Corn Syrup Solids | 19 |
| Binder Hydrolyzed Casein | 4 |
| Compound Coating | 7 |
| Nonfat Dry Milk | 10 |

The resulting mixture is then mixed vigorously to produce a homogeneous mass which is then pressed and molded and the molded products are then coated with conventional so called compound coatings. Alternatively, chocolate liquors are used for the coatings.

II.2 Low Calorie Confection

The procedure of Example II.1 is repeated except that no final coatings are applied following molding.

III. Snack Foods

EXAMPLE III.1 Granola Bars

A combination of expanded, dried, internally flavored hulled cereal grain comprising barley, wheat, and oats are mixed together and then added to water, nonfat dry milk, solids, gums, and binders in accordance with the following formulation:

| Granola Bar | |
|---|---|
| Ingredient | Parts |
| Internally Flavored Barley (Expanded) | 20 |
| Internally Flavored Wheat (Expanded) | 10 |
| Internally Flavored Oats (Expanded) | 20 |
| Compound Coating | 8 |
| Nonfat Dry Milk | 15 |
| Water | 23 |
| Gums/Binders | 4 |

The resulting mixture is blended vigorously until homogeneity is reached after which such is pressed, molded, and coated with compound coatings.

IV. Condiments (Spices)

IV.1 Sachets

The procedure of Example I.1 is repeated with a variety of spices being used for internally flavoring (preferably essential oil as taught herein). After drying and grinding as described in such Example I.1 sachets are prepared. The resulting sachets are suitable for flavoring foodstuffs such as hot cider, soups, and the like.

IV.2 Particulant Flavorant

The procedure of Example IV.1 is repeated except that the resulting ground powder is blended with trisodium phosphate as an anticaking agent at the rate of 2 parts phosphate per 100 parts of powder. The resulting mixture is then charged into a salt dispenser is used for flavoring foodstuffs by shaking to dispense by topical application.

V. Fabricated Foods

V.1 Imitation Bacon Bits

An internally flavored barley prepared as in Example 2.8 above. After washing and drying the product is then expanded by frying as in Example I.1. The expanded product is then dryed and then is ground to a particle size similar to that achieved in Example I.1. The flavorant used is that of bacon (as illustrated above). The particle size of the resulting ground product is chosen to resemble that of "Bake-O-Bits". The color used and the texture chosen also resembles also such prior art product. Organoleptic evaluation of the final product demonstrates great similarity to natural fried bacon bits.

By substituting other flavors for bacon various meat flavors are produced.

V.2 Flavored Shaped Bodies

An internally flavored wheat prepared as described above in Example 6 is milled into flour, and the resulting flour is formulated conventionally with leavening agent, salt, and water to provide a dough. This dough is then sheeted and baked (or alternatively expanded with convention extrusion). The resulting products are found to retain the original internal flavor.

V.3 Popped Wheat

Wheat is internally flavored by the procedure of Example 2.1 above. After washing and drying, the product is popped in the conventional manner and the product is found to comprise an edible snack flavored with the internal flavorant above described.

VI. Soups, Stews, and Stuffings

VI.1 Dehydrated Meat Flavored Soup Concentrate

An internally chicken flavored barley is prepared using the procedure of Example 2.8 except replacing the flavor with a chicken flavorant system. After washing, drying, expanding, and grinding as in Example I.1, a dehydrated chicken soup concentrate is produced. When water is admixed therewith, an instant chicken-flavored soup results.

VI.2 Dehydrated Egg Drop Soup

The procedure of Example VI.1 is repeated except that an egg flavored rice is substituted for the barley. After washing, drying, and grinding to produce a powder, a resulting powder is then blended with some unground flavor impregnation starting rice material. The resulting material is a dehydrated egg flavored chicken drop soup which when added to hot water makes an instant egg drop soup.

VI.3 Dehydrated Vegetable Soup

The procedure of Example VI.1 is repeated except that a vegetable flavor replaces the chicken flavor.

VI.4 Beef Stew

The procedure of Example VI.1 is repeated except that a beef flavor replaces the chicken flavor. When the concentrate is added to a stew mixture in process of cooking, the stew flavor of the resulting beef stew is substantially improved.

VI.5 Stuffing Flavor Concentrate

The procedure of Example VI.1 is repeated and the product used is admixed with a bread stuffing to produce a chicken flavored stuffing.

VII. Dietary Supplements

VII.1 Flavored High Fiber Dietary Supplement

The procedure of Example II.2 is repeated and the product produced is used as a high fiber dietary supplement.

Although the teachings of my invention have herein been discussed with reference to specific embodiments, it is to be understood that these are by way of illustration only and ther others may wish to utilize my invention in different designs or applications.

I claim:

1. A process for introducing an organic flavorant into hulled cereal grain comprising the steps of contacting such grain with said flavorant under aqueous liquid phase conditions while maintaining said liquid phase at a temperature in the range from about 60° to 200° F. for a time at least sufficient to introduce into the endosperm of such hulled cereal grain at least an organoleptically detectable taste of said flavorant without substantial change in hull structure, said flavorant containing at least four carbon atoms per molecule, and, when said flavorant contains at least one carboxyl group per molecule, then said flavorant has a dissociation constant in water which is less than about $1 \times 10^{-5}$ whereby, when such grain's hull is separated from such grain's germ and endosperm, the flavor associated with such flavorant material is organoleptically detectable in such germ and endosperm.

2. The process of claim 1 wherein said temperature ranges from about 65° to 135° F.

3. The process of process of claim 1 wherein said flavorant is substantially completely dispersed in said aqueous phase during said contacting and said maintaining.

4. The process of claim 3 wherein said aqueous carrier comprises water.

5. The process of claim 4 wherein said aqueous carrier comprises water and from about 0.1 to 45 weight percent on a 100 weight percent total aqueous carfier basis of a substantially inert organic water-miscible liquid which has a molecular weight under about 250 and which has a boiling point under about 250° F.

6. The process of claim 5 wherein said inert organic liquid has a molecular weight under about 100 and has a boiling point under about 100° F.

7. The process of claim 3 wherein said aqueous phase comprises on a 100 weight percent total basis
(A) from about 0.5 to 45 weight percent of said flavorant, and, correspondingly
(B) from about 55 to 99.5 weight percent of and aqueous carrier.

8. The process of claim 7 wherein in said treating composition said aqueous carrier comprises water.

9. The process of claim 1 wherein said taste is organoleptically excessive relative to the characteristic taste of a given natural product which said flavorant organoleptically resembles.

10. The process of claim 1 wherein an additional quantity of said flavorant is admixed with said aqueous phase to maintain the total quantity of said flavorant in said aqueous phase at a predetermined level.

11. The process of claim 1 wherein the resulting contacted hulled cereal grain is washed with a liquid carrier to remove residual flavorant from surfaces of said grain, said washing being carried out while minimizing extraction of said flavorant from said resulting grain and while minimizing change in the hull structure of said resulting grain.

12. The process of claim 1 wherein the contacted hulled cereal grain is dried in a gaseous environment while minimizing volatilization of said flavorant and while minimizing change in the pericarp structure of said grain.

13. The process of claim 12 wherein said drying is carried out for a time sufficient to provide a dried grain moisture content in the range from about 11 to 17 weight percent based on total weight of said dried grain.

14. The process of claim 13 wherein said moisture content ranges from about 9 to 16 weight percent.

15. The process of claim 1 wherein said hulled cereal grain is popcorn.

16. The process of claim 13 said hulled cereal grain is popcorn.

17. The process of claim 1 wherein said hulled cereal grain is wheat.

18. The process of claim 1 wherein said hulled cereal grain is oats.

19. The process of claim 1 wherein said hulled cereal grain is rye.

20. The process of claim 1 wherein said hulled cereal grain is barley.

21. The process of claim 1 wherein said hulled cereal grain is triticale.

22. The process of claim 1 wherein said hulled cereal grain is rice.

23. The process of claim 1 wherein said hulled cereal grain is sorghum.

24. The process of claim 1 wherein said hulled cereal grain is millet.

25. A process for producing internally flavored popcorn comprising the steps of:
    (A) contacting popcorn with an aqueous organic flavorant composition at a temperature ranging from about 70° to 130° F. for a time sufficient to introduce into such popcorn a quantity of said flavorant which is at least sufficient to produce therein an organoleptically detectable taste which is excessive compared to the characteristic taste of a given natural material containing a flavor like that of said flavorant without any substantial change in popcorn pericarp, said flavorant containing at least four carbon atoms per molecule, and, when said flavorant contains at least one carboxyl group per molecule, then said flavorant has a dissociation constant in water which is less than about $1 \times 10^{-5}$,
    (B) washing the resulting so contacted popcorn with water to remove therefrom residual such flavorant from surfaces thereof, and
    (C) drying said washed popcorn until the moisture content thereof is reduced to a sufficient level where the resulting dried popcorn is poppable.

26. The process of claim 25 wherein the moisture content of such so dried popcorn ranges from about 13 to 17 weight percent on a 100 weight percent total popoorn basis.

27. The process of claim 25 wherein said flavorant composition comprises on a 100 weight percent basis from about 5 to 25 weight percent organic flavorant with the balance up to 100 weight percent thereof being water.

28. A process for introducing an organic flavorant into hulled cereal grain comprising the steps of contacting such grain with an aqueous liquid phase composition comprising on a 100 weigth percent total basis.
    (A) from about 0.5 to 45 weight percent of substantially completely dissolved said flavorant,
    (B) from about 1 to 10 weight percent of at least one dissolved edible ionic salt, and
    (C) from about 55 to 99.5 weight percent of an aqueous carrier,
while maintaining a temperature in the range from about 60° to 200° F. for a time at least sufficient to introduce into such hulled cereal grain at least an organoleptically detectable taste of said flavorant without substantial change in hull structure, said flavorant containing at least four carbon atoms per molecule, and, when said flavorant contains at least one carboxyl group per molecule, then said flavorant has a dissociation contant in water which is less than about $1 \times 10^{-5}$.

29. The process of claim 28 wherein in said salt the cation is selected from the group consisting of alkali metals, alkaline earth metals, and ammonium and the anion is selected from the group consisting of halides, nitrates, sulfates, phosphates, carbonates, and edible mono-, di-, and tri-carboxylates containing less than seven carbon atoms each.

30. The process of claim 29 wherein said salt comprises sodium chloride.

31. The process of claim 29 wherein said salt is potassium chloride.

32. The process of claim 28 wherein said aqueous phase additionally contains dissolved therein from about 0.05 to 3 weight percent on said basis of at least one edible surfactant.

33. The process of claim 32 wherein said surfactant is nonionic.

* * * * *